United States Patent [19]

Takahashi et al.

[11] Patent Number: 4,656,080

[45] Date of Patent: Apr. 7, 1987

[54] WATERPROOF COMPOSITE SHEET MATERIAL

[75] Inventors: Shigeru Takahashi, Ibaraki; Makoto Tanaka, Toyonaka; Kunio Tanaka, Ibaraki, all of Japan

[73] Assignee: Teijin Limited, Osaka, Japan

[21] Appl. No.: 772,318

[22] Filed: Sep. 4, 1985

[30] Foreign Application Priority Data

Sep. 7, 1984 [JP] Japan ................................. 59-186484
Sep. 10, 1984 [JP] Japan ................................. 59-188110

[51] Int. Cl.[4] ............................................... B32B 7/00
[52] U.S. Cl. .................................... 428/215; 428/219;
428/252; 428/423.7; 428/480; 428/910

[58] Field of Search ............ 428/215, 219, 252, 423.7, 428/480, 910

[56] References Cited

U.S. PATENT DOCUMENTS 4,554,205 11/1985 Mahr ................................... 428/252

Primary Examiner—Marion C. McCamish
Attorney, Agent, or Firm—Burgess, Ryan & Wayne

[57] ABSTRACT

A waterproof composite sheet material useful for sails of wind surfing equipment and boats, comprising a water-repellent fibrous sheet substrate impregnated with a water-repellent material and waterproof thermoplastic resin film layers firmly bonded to the surfaces of the substrate through waterproof bonding material layers.

16 Claims, No Drawings

WATERPROOF COMPOSITE SHEET MATERIAL

BACKGROUND OF THE INVENTION (1) Field of the Invention

The present invention relates to a waterproof composite sheet material. More particularly, the present invention relates to a waterproof composite sheet material useful for sails of wind surfing equipment or sail boats.

(2) Description of the Related Art

It is well known to make waterproof sheet materials for tents, sails, or cover sheets out of a fibrous sheet material and waterproof covering layers formed on one or both surfaces of the sheet material and consisting essentially of a thermoplastic resin, for example, polyvinyl chloride resin.

When the waterproof sheet material is required to be light, the covering layer is made of a polyacrylic resin or chlorosulfonated polyethylene resin.

Also, it is known to produce waterproof sheet materials for sails of wind surfing equipment or sail boats by coating or impregnating both surfaces of a fibrous sheet material with a waterproof resinous material, for example, a melamine-formaldehyde resin or polyacrylic ester resin, or by laminating waterproof thermoplastic resin films on both surfaces of a fibrous sheet material.

For example, Japanese Unexamined Patent Publication No. 58-222847, published on Dec. 24, 1983 for Toray Inc. discloses a sail laminate consisting of a biaxially drawn polyester film and at least one fibrous sheet material layer bonded to at least one surface of the polyester film with a bonding material consisting of a thermoplastic polyesterether copolymer.

Also, Japanese Unexamined Utility Model Publication (Kokai) No. 59-187436, published on Dec. 12, 1984 for Teijin Limited, discloses a sail cloth consisting essentially of a laminate of a plain weave fabric made of polyester filament warps and wefts and polyester film layers bonded to the fabric with a polyurethane resin bonding material, which laminate is characterized in that all the elongations of the fabric in the directions of the warps, the wefts and the bias under a tension of 18 kg/5 cm are 3% or less and the peeling strength of the fabric from the polyester film layer is more than 2 kg/3 cm.

However, when the conventional sheet materials are immersed in fresh water or seawater for a long period of time, it was found that the fresh water or seawater penetrated into the inside of the sheet material due to the capillarity of the fabric.

This penetration of fresh water or seawater causes the following problems.

(1) The peeling strength of the fabric layer from the polyester film layer is degraded by the penetrated fresh water or seawater. This phenomenon results in separation of the fabric layer from the film layer.

(2) When the penetrated fresh water or seawater is maintained between the fabric layer and the polyester film layer for a long period of time, the sheet material is discolored and/or mildew grows on the sheet material.

Accordingly, it is strongly desired to provide a new type of waterproof sheet material which is free from penetration of fresh water or seawater therein.

SUMMARY OF THE INVENTION

An object of the present invention to provide a waterproof composite sheet material which is highly resistant to penetration of water therein even after it is immersed in water for a long period of time.

Another object of the present invention is to provide a waterproof composite sheet material useful for sails of wind surfing equipment and sail boats, tents, and covering sheets.

The above-mentioned objects can be attained by the waterproof composite sheet material of the present invention, which comprises a water-repellent substrate consisting of a fibrous sheet impregnated with a water-repellent material, and water-proof thermoplastic resin film layers firmly bonded to both the surfaces of the water-repellent substrate with waterproof bonding material layers.

DESCRIPTION OF THE PREFERRED EMBODIMENTS

In the waterproof composite sheet material, the substrate consists of a fibrous sheet impregnated with a water-repellent material and, therefore, is highly water-repellent and waterproof.

The fibrous sheet is not limited to a specific form of sheet. That is, the fibrous sheet can be selected from woven fabrics, for example, scrims (coarse woven fabrics and interlaid fabrics), knitted fabrics, for example, raschel knitted fabrics and weft-inserted knitted fabrics, net-formed fabrics, and composite fabrics composed of two or more of the above-mentioned fabrics. Preferably, the fibrous sheet is a scrim composed of warps and wefts each composed of a multifilament yarn having a denier of 250 and having warp and weft densities of 4 yarns/cm.

The fibrous sheet can be made by any type of fibers and filaments. For example, thermoplastic synthetic fibers and filaments, for example, polyester, aliphatic polyamide, aromatic polyamide, and polyolefin fibers and filaments; natural fibers, for example, cotton, ramie, hemp, and jute; metallic fibers, for example, steel and, stainless steel fibers; metal compound fibers, for example, copper-aluminum compound fibers; and inorganic fibers, for example, carbon and glass fibers and filaments.

When the waterproof composite sheet material is used for sails of wind surfing equipment and boats, it is required to have a light weight, low elongation, low hygroscopicity, high weather resistance, and a high durability. In view of the above-mentioned requirements, the fibrous sheet for the sails is preferably made of synthetic thermoplastic fibers and filaments, especially, polyester fibers and filaments, more especially, polyethylene terephthalate fibers and filaments. Preferably, the synthetic thermoplastic fiber or filament yarn is composed of individual fibers or filaments having a denier of 0.5 to 250 and has a total denier of from 50 to 5,000. It is preferable that the fibrous sheet have a weight of from 20 to 500 g/m$^2$.

The fibrous sheet is impregnated with a water-repellent material. Therefore, the resultant substrate is water-repellent and waterproof and does not permit fresh water or seawater to penetrate therein.

The water-repellent material is not limited to a specific group of water-repellent agents as long as the resultant substrate exhibits a satisfactory water-repellent property and durability and adhering property to the bonding material. Usually, the water-repellent material is selected from tetrafluorocarbon compounds, for example, ASAHIGUARD AG-710 (trademark, produced by Meisei Chemical Co.), ethyleneurea compounds, for example, OCTEX' EM (trademark, produced by Hodogaya Chemical Co.), alkylurea compounds, for example, GERANEX OM (trademark, produced by Matsumoto Ushi Co.), triazine compounds, for example, melamine-formaldehyde resin, (for example, SUMIPEL RESIN N, trademark, produced by Sumitomo Chemical Co.), and zirconium-fatty acid compounds, for example, DAIROOF #700 (trademark, produced by Daiwa Chemical Co.).

Some conventional water-repellent materials comprising silicone compounds or parafin materials which can serve as a mold-release agent are not appropriate for the present invention, because they result in a decreased adhering property of the resultant water-repellent substrate to the bonding material.

The water-repellent material is preferably impregnated in an amount of from 0.05% to 5.0%, preferably, from 0.1% to 3.0%, based on the weight of the fibrous sheet. When the amount of the water-repellent material applied to the fibrous sheet is less than 0.05%, the resultant substrate exhibits an unsatisfactory water-repellency and, sometimes, cannot satisfactorily prevent the undesirable penetration of fresh water or seawater therein. If the amount of the water-repellent material applied to the fibrous sheet is more than 5%, the resultant thick layer of the water-repellent material between the fibrous sheet and the bonding material layer is, sometimes, cracked when the resultant composite sheet material is deformed or compressed, for example, by the action of wind, or while it is stored for a long period of time.

The method for impregnating the fibrous sheet with the water-repellent material is not limited to a specific method. For example, the yarns are impregnated with a sizing material containing the water-repellent material and then the water-repellent yarns are converted to a water-repellent fibrous sheet substrate. Otherwise, the fibrous sheet is impregnated with the water-repellent material alone, with a sizing material containing the water-repellent material, or with a mixture of the water-repellent material with a waterproof resinous material, by means of back-sizing procedures, immersing and squeezing procedures, coating procedures, or spraying procedures.

Both the surfaces of the water-repellent fibrous sheet substrate are firmly bonded with waterproof thermoplastic resin film layers through waterproof bonding material layers.

The waterproof bonding material layers preferably have a thickness of from 5 to 100 microns, more preferably from 10 to 50 microns. When the thickness of the bonding material layers is less than 5 microns, the peeling strength of the substrate from the resin film layers is, sometimes, unsatisfactory. Also, a thickness of the bonding material layer over 100 microns sometimes, results in excessive weight of the resultant product.

The bonding material usable for the present invention can be selected from conventional waterproof thermoplastic bonding materials, for example, polyurethanes, polyvinyl acetate, polyacrylic esters, polyamides, and polyester copolymers. Preferably, the bonding material consists of a polyurethane having a softening point of from 50° C. to 150° C.

When a polyurethane having a softening point of less than 50° C. is used as the bonding material, and the resultant composite sheet material is exposed to an elevated temperature higher than the atmospheric air temperature while it is used or stored, the bonding activity of the bonding material, sometimes, rapidly decreases. Also, a polyurethane bonding material having a softening point of more than 150° C. should be applied at an elevated temperature of more than 150° C. This elevated temperature causes undesirable degradation of the resin film layers.

The waterproof thermoplastic resin film can be selected from polyvinyl chloride, polyvinylidene chloride, polyacrylic ester, polyethylene, polyester, and polyamide resin films. It is preferable that the resin film be selected from biaxially drawn polyester resin films, especially, polyethylene terephthalate resin films.

The resin film preferably has a thickness of 12 to 200 microns, more preferably, from 20 to 150 microns. If the thickness is less than 12 microns, the resultant composite sheet material sometimes exhibits an unsatisfactorily large degree of elongation, especially, in the bias direction of the sheet material. If the thickness of the resin film layer is more than 200 microns, the resultant composite sheet material sometimes exhibits an unsatisfactorily large weight and low flexibility. The composite sheet material of the present invention preferably has a weight of from 50 to 1500 g/m$^2$ and a thickness of from 100 to 800 microns.

The composite sheet material of the present invention can be produced, for example, by the following process.

(1) In each of two thermoplastic resin films, one surface of the film is coated with a liquid containing a bonding material, preferably by means of a conventional coating device, for example, a doctor knife, kiss contact coating roll, doctor coating roll, and COMMA type doctor.

(2) The resultant layer of the bonding material-containing liquid is dried at a temperature of from 80° C. to 120° C. for 0.5 to 3 minutes, for example, about one minute.

(3) Separately, a fibrous sheet is impregnated with a water-repellent material-containing liquid and, then, is dried.

(4) The resultant water-repellent fibrous sheet substrate is interposed between the two resin films so that the surfaces of the substrate are brought into contact with the dried bonding material layers on the resin films.

(5) The resultant precursory composite sheet material (resin film layer—bonding material layer substrate—bonding material layer—resin film layer) is pressed at an elevated temperature by means of a pair of nip-heating rollers, for example, at a temperature of from 100° C. to 130° C. under a pressure of from 3 to 4 kg/cm$^2$ at a speed of 15 to 20 m/min. The press-heating procedure is preferably repeated twice or more.

The bonding material layers may be formed on the surfaces of the water-repellent fibrous sheet substrate and then the resin films are placed on the surfaces of the bonding material layers coated on the substrate to provide a precursory composite sheet material.

In the composite sheet material of the present invention, the substrate is water-repellent and waterproof. Therefore, even if the resin film layers are cracked and fresh water or seawater penetrates into the composite sheet material the substrate does not absorb the water and the weight of the composite sheet material does not increase.

Also, fresh water or seawater cannot penetrate into the inside of the composite sheet material through the substrate. Therefore, the bonding material layers can be maintained unchanged over a long period of time.

Furthermore, the fibrous sheet in the substrate does not directly contact fresh water or seawater. Therefore, there is no discoloration and no growth of mildew in the fibrous sheet. Also, there is no decrease in peeling strength of the fibrous sheet over a long period of time.

The present invention will be further explained by way of specific examples, which, however, are representative and do not restrict the scope of the present invention in any way.

In the examples, the following tests are carried out.
(1) Measurement of water-absorptions A sheet specimen having a width of 5 cm and a length of 30 cm was brought into contact with red water, i.e., a mixture of the same weights of water and red ink, in such a manner that the lower end portion of the specimen having a length of 1 cm was immersed in the red water for 24 hours. The height in cm of the level of red water sucked up by the specimen from the level of the red water bath was measured.

(2) Crease flex test

In accordance with Japanese Industrial Standard (JIS) K 6328, a specimen was subjected to a crease flex test wherein the specimen was flexed 250 times by using a Scott crease flex tester.

(3) Increase in weight in water immersion

A specimen was subjected to measurement of its dry weight. The specimen was immersed in water at a liquor ratio of 1:30 and laundered in an eddy flow type laundering machine for 90 minutes. The specimen was taken up from water and water drops on the specimen surfaces were wiped off. The weight of the specimen was measured. The increase in weight of the specimen was calculated in accordance with the following equation.

$$\text{Increase in weight (\%)} = \frac{W - W_0}{W_0} \times 100$$

wherein $W_0$ represents the weight of the specimen before laundering and $W$ represents the weight of the specimen after laundering.

(4) Peeling strength

A specimen having a width of 3 cm and a length of 15 cm was subjected to a peeling test in accordance with JIS K 6772, in which a thermoplastic resin film layer is peeled off from a substrate at a speed of 25 m/min by using a tensile tester.

EXAMPLE 1

A plain weave fabric was produced from polyethylene terephthalate multifilament yarns having a yarn count of 150 deniers/48 filaments in a warp density of 58 yarns/25.4 mm and in a weft density of 52 yarns/25.4 mm.

The fabric was scoured in accordance with a usual scouring process and dried.

The fabric was immersed in an aqueous liquid containing a water-repellent mixture of 2.0% by weight of melamine-formaldehyde resin (available under a trademark of Sumitex Resin M-3 produced by Sumitomo Chemical Co.) with 0.5% by weight of an organic amine type catalyst (available under a trademark of Sumitex accelerator ACX produced by Sumitomo Chemical Co.) and 5.0% by weight of a fluorocarbon type water-repellent agent (available under a trademark of Asahiguard AG-710 produced by Meisei Chemical Co.), in 92.5% by weight of water, and, then, was squeezed with a mangle to an extent such that the dry weight of the water-repellent mixture remained on the fabric was 1.5% based on the weight of the fabric. The resultant fabric impregnated with the water-repellent mixture was dried at a temperature of 120° C. for 2 minutes and, then, heat-treated at a temperature of 160° C. for 1 minute to provide a water-repellent fibrous sheet substrate.

Separately, a surface of a biaxially drawn polyethylene terephthalate film having a thickness of 30 microns was coated with a mixture of 97% by weight of a polyurethane resin bonding material having a softening point of 78° C. (available under a trademark of Nippolan 5032, produced by Japan Polyurethane Co.) with 3% by weight of a isocyanate cross-linking agent (available under a trademark of Coronate HL, produced by Japan Polyurethane Co.) to an extent such that a dry bonding material layer having a thickness of 25 microns was formed by using a COMMA type doctor. The resultant bonding material layer was dried at a temperature of 100° C. for one minute.

The water-repellent substrate was interposed between two polyethylene terephthalate films so that the surfaces of the substrate came into contact with the bonding material layers on the polyethylene terephthalate films.

The resultant precursory composite sheet material was heat-pressed by using a pair of nip rollers at a surface temperature of 120° C. under a pressure of 3.0 kg/cm² at a speed of 15 m/min.

The resultant waterproof composite sheet material had the properties shown in Table 1.

EXAMPLE 2

A plain weave fabric was produced from polyethylene terephthalate multifilament yarns having a yarn count of 500 deniers/96 filaments in a warp density of 20 yarns/25.4 mm and in a weft density of 15 yarns/25.4 mm.

The fabric was scoured and dried in the usual manner. The fabric was then immersed in an aqueous liquid containing a water-repellent mixture of 9% by weight of a polyester sizing agent (available under the trademark of Eastman WNT, produced by Nagase Sangyo Co.) and 6% by weight of a fluorocarbon water-repellent agent (Asahiguard AG-730) in 85% by weight of water. The fabric was squeezed at a pick-up of 4.0% by dry weight of the water-repellent mixture, was dried at a temperature of 130° C. for one minute, and, then, was heat-treated at a temperature of 180° C. for one minute to provide a water-repellent substrate.

Separately, a biaxially stretched polyethylene terephthalate film having a thickness of 50 microns was coated with a polyurethane bonding agent (Nippolan 5032) by using a doctor knife so as form a bonding material layer having a dry thickness of 50 microns. The bonding material layer was dried at a temperature of 60° C. for 3 minutes.

The water-repellent substrate was sandwiched between two polyethylene terephthalate films and the bonding material layers to provide a precursory composite sheet material.

The resultant precursory composite sheet material was heat-pressed by using a pair of nip rollers at a surface temperature of 80° C. under a pressure of 4.5 kg/cm² at a speed of 20 m/min.

The properties of the resultant composite sheet material are shown in Table 1.

COMPARATIVE EXAMPLES 1 AND 2

In Comparative Example 1, the same procedures as those described in Example 1 were carried out, except that the polyethylene terephthalate fabric was not impregnated with the water-repellent mixture.

In Comparative Example 2, the same procedures as those described in Example 2 were carried out except that no impregnation of the water-repellent mixture was applied to the fabric.

The properties of the resultant comparative composite sheet materials are shown in Table 1.

TABLE 1

| Example No. | Height of absorbed water level (cm) | | Increase in weight by water immersion (%) | Peeling strength (kg/3 cm) |
| --- | --- | --- | --- | --- |
| | Before crease | After flex test | | |
| Example 1 | 0 | 0 | 1.8 | 3.8 |
| Example 2 | 0 | 0 | 2.5 | 2.6 |
| Comparative 1 | 12.5 | 20.5 | 18.0 | 4.0 |
| Example 2 | 22.5 | 25.8 | 17.2 | 3.0 |

EXAMPLE 3 AND COMPARATIVE EXAMPLE 3

In Example 3, a plain weave fabric was produced from polyethylene terephthalate multifilament yarns having a yarn count of 500 deniers/96 filaments at a warp density of 30 yarns/25.4 mm and at a weft density of 14 yarns/25.4 mm.

The fabric was secured, dried, and, then, impregnated with 4.5% by dry weight of a water-repellent mixture of 9 parts by weight of the polyester sizing agent (Eastman WNT) with 6 parts by weight of the fluorocarbon water-repellent agent (Asahi-guard 710). The water-repellent mixture-impregnated fabric was dried at a temperature of 120° C. for 2 minutes and, then, heat-treated at a temperature of 180° C. for one minute to provide a water-repellent substrate.

A surface of a biaxially stretched polyethylene terephthalate film having a thickness of 25 microns was coated with a polyurethane bonding material (Nippolan 5032) having a softening point of 78° C. by means of a COMMA type doctor, and, then, dried at a temperature of 100° C. for one minute to form a bonding material layer having a dry thickness of 30 microns.

The water-repellent substrate was interposed between two polyethylene terephthalate films having the bonding material layers so that the bonding material layers come into contact with the substrate. The resultant precursory composite sheet material was heat-pressed by means of a pair of nip rollers at a temperature of 120° C. under a pressure of 3.3 kg/cm$^2$ at a speed of 15 m/min.

Table 2 shows the properties of the resultant composite sheet material.

In Comparative Example 3, the same procedures as those mentioned in Example 3 were carried out except that no water-repellent mixture was applied to the fabric. The results are also shown in Table 2.

EXAMPLE 4 AND COMPARATIVE EXAMPLE 4

In Example 4, a weft-inserted knitted fabric was produced from polyethylene terephthalate multifilament warps having a yarn count of 250 deniers/48 filaments, nylon 66 warps having a yarn count of 105 deniers/35 filaments, and polyethylene terephthalate wefts having a yarn count of 500 deniers/96 filaments at a density of 11 ganges. The fabric had a weight of 65 g/m$^2$.

The fabric was scoured, dried, and then impregnated with 1.2% by dry weight of a water-repellent mixture of 8 parts by weight of the fluorocarbon water-repellent agent (Asahiguard AG730) with 5 parts by weight of a melamine-formaldehyde resin (Sumitex Resin M-3) and 0.3 parts by weight of the organic amine catalyst (Sumitex Accelerator ACX). The impregnated fabric was dried at a temperature of 120° C. for one minute and then heat-treated at a temperature of 180° C. for one minute, to provide a water-repellent substrate.

A surface of a biaxially stretched polyethylene terephthalate film having a thickness of 38 microns was coated with a polyurethane bonding material (Nippolan 5032) by means of a COMMA type doctor. The coated film was dried at a temperature of 100° C. for one minute to form a bonding material layer having a thickness of 25 microns.

The water-repellent substrate was sandwiched between two films with the bonding material layers so that the bonding material layers come into contact with the substrate surfaces.

The resultant precursory composite sheet material was heat-pressed twice by using a pair of nip rollers at a surface temperature of 130° C. under a pressure of 3.0 kg/cm$^2$ at a speed of 15 m/min.

The properties of the resultant composite sheet material are shown in Table 2.

In Comparative Example 4, the same procedures as those described in Example 4 were carried out except that no water-repellent mixture was applied to the fabric. The results are shown in Table 2.

EXAMPLE 5 AND COMPARATIVE EXAMPLE 5

In Example 5, a scrim having warp and weft densities of 4 yarns/cm was produced from polyethylene terephthalate multifilament yarns having a yarn count of 500 deniers/96 filaments.

The scrim was scoured, dried, and then impregnated with 25.3% by dry weight of a water-repellent mixture of 40 parts by weight of an polyacrylic ester resin (which was available under a trademark of Primal HA-16, made by Rohm and Haas Co.) and 8 parts by weight of an ethylene-urea-formaldehyde resin (available under a trademark of Octex EM, made by Hodogaya Chemical Co.).

The impregnated fabric was dried at a temperature of 120° C. for 5 minute and then heat-treated at a temperature of 180° C. for one minute.

The resultant water-repellent scrim was laminated and converted to a composite sheet material in the same manner as that mentioned in Example 3.

Table 2 shows the properties of the resultant waterproof composite sheet material.

In Comparative Example 5, the same procedures as those described in Example 5 were carried and, except that no water-repellent mixture was applied to the scrim. The results are shown in Table 2.

TABLE 2

| Example No. | Height of absorbed water level | | Increase in weight of water immersion (%) | Peeling strength (kg/3 cm) |
| --- | --- | --- | --- | --- |
| | Before crease | After flex text (cm) | | |
| Example 3 | 0 | 0 | 2.6 | 3.24 |

TABLE 2-continued

| Example No. | Height of absorbed water level | | Increase in weight of water immersion (%) | Peeling strength (kg/3 cm) |
| --- | --- | --- | --- | --- |
| | Before crease | After flex text (cm) | | |
| Example 4 | 0 | 0 | 3.5 | 3.45 |
| Example 5 | 0.5 | 0.5 | 4.3 | 3.45 |
| Comparative | | | | |
| Example 3 | 21.5 | 25 | 16.0 | 3.3 |
| Example 4 | 25 | >30 | 17.5 | 3.5 |
| Example 5 | >30 | >30 | 17.8 | 4.0 |

We claim:

1. A waterproof composite sheet material comprising:
a water-repellent substrate consisting of a fibrous sheet impregnated with a water-repellent material and
waterproof thermoplastic resin film layers firmly bonded to both the surfaces of the water-repellent substrate with waterproof bonding material layers.

2. The composite sheet material as claimed in claim 1, wherein said fibrous sheet is a woven fabric consisting of synthetic filament yarns.

3. The composite sheet material as claimed in claim 2, wherein said woven fabric has a weight of 20 to 500 g/m$^2$.

4. The composite sheet material as claimed in claim 2, wherein said synthetic filament yarns have a total denier of 50 to 5000 and consists of polyethylene terephthalate filaments each having a denier of 0.5 to 250.

5. The composite sheet material as claimed in claim 1, wherein said water-repellent material consists essentially of at least one member selected from the group consisting of tetrafluorocarbon compounds, ethyleneurea compounds, alkylurea compounds, triazine compounds, and zirconium-fatty acid compounds.

6. The composite sheet material as claimed in claim 1, wherein said waterproof thermoplastic film layers consist of a thermoplastic resin selected from the group consisting of polyvinyl chloride resins, polyvinylidene chloride resins, polyacrylic ester resins, polyethylene resins, polyester resins, and polyamide resins.

7. The composite sheet material as claimed in claim 1, wherein said waterproof thermoplastic film layers has a thickness of from 12 to 200 microns.

8. The composite sheet material as claimed in claim 1, wherein said waterproof thermoplastic film layers consist of polyester resin films having a thickness of from 12 to 200 microns.

9. The composite sheet material as claimed in claim 8, wherein said polyester resin films are biaxially drawn polyethylene terephthalate resin films.

10. The composite sheet material as claimed in claim 1, wherein said bonding material layers comprise at least one bonding material selected from polyurethane resins, polyvinyl acetate resins, polyacrylic ester resins, polyamide resins, and polyester resins.

11. The composite sheet material as claimed in claim 1, wherein said bonding material layer consists of a polyurethane resin and a thickness of from 5 to 100 microns.

12. The composite sheet material as claimed in claim 11, wherein the polyurethane resin has a softening point of from 50° C. to 150° C.

13. The composite sheet material as claimed in claim 1, which has a weight of from 50 to 1500 g/m$^2$ and a thickness of from 100 to 800 microns.

14. The composite sheet material as claimed in claim 1, wherein said water-repellent substrate consists of a polyethylene terephthalate filament fabric impregnated with a water-repellent material, and said water-repellent thermoplastic resin film layers consist of biaxially drawn polyethylene terephthalate films having a thickness of from 12 to 200 microns and are bonded to both the surfaces of the water repellent substrate through polyurethane resin bonding material layers having a thickness of 12 to 200 microns and a softening temperature of from 50° C. to 150° C.

15. The composite sheet material as claimed in claim 1, which is in the form of a sail of wind surfing equipment.

16. The composite sheet material as claimed in claim 1, which is in the form of a sail of a boat.

* * * * *